(No Model.)
W. MAXWELL.
METHOD OF CARBONIZING INCANDESCENTS.
No. 364,031. Patented May 31, 1887.
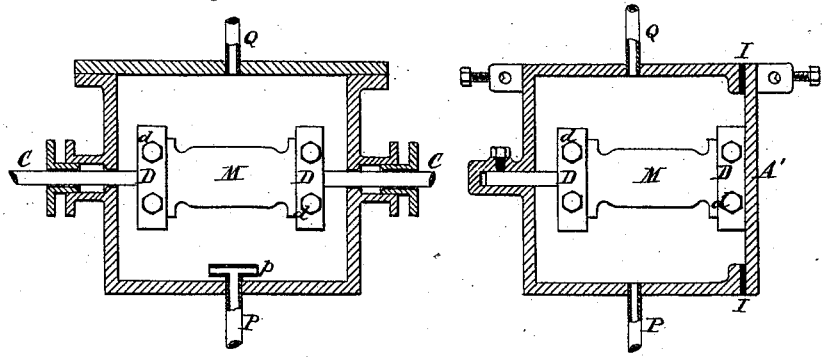

UNITED STATES PATENT OFFICE.

WILLIAM MAXWELL, OF CLAYBROOK ROAD, FULHAM, COUNTY OF MIDDLESEX, ENGLAND.

METHOD OF CARBONIZING INCANDESCENTS.

SPECIFICATION forming part of Letters Patent No. 364,031, dated May 31, 1887.

Application filed September 22, 1886. Serial No. 214,265. (No model.) Patented in England November 10, 1885, No. 13,639, and July 29, 1886, No. 9,805, and in Belgium September 16, 1886, No. 74,554.

*To all whom it may concern:*

Be it known that I, WILLIAM MAXWELL, a citizen of England, residing at Claybrook Road, Fulham, county of Middlesex, England, have invented a new and useful Method of Carbonizing Filaments for Incandescent Electric Lamps, (for which I have obtained patents in Great Britain, dated November 10, 1885, No. 13,639, and July 29, 1886, No. 9,805, and in Belgium, September 16, 1886, No. 74,554,) of which the following is a specification.

My invention relates to a method of carbonizing the fibers, threads, or filaments that are to form the illuminating-conductors of incandescent electric lamps, employing for that purpose apparatus whereby the process can be conveniently carried on.

According to my method, the fibers, threads, or filaments are placed in a suitable case or mold, and are therein subjected to a high temperature produced by electrically heating the case or mold, while the whole is inclosed in a chamber containing or having passed through it a gas which does not enter injuriously into combination with the heated carbonaceous material, or, instead of charging the chamber with such gas, it may be exhausted to a high degree; but this is troublesome and inconvenient. I therefore prefer to charge the chamber with gas, as above stated. The case or mold is made of highly-refractory material which is a conductor of electricity, but has considerable electrical resistance, so that it can be highly heated by the passage of an electrical current through it. Carbon, or a composite substance consisting chiefly of carbon, is a suitable material for this purpose. The gas supplied to the chamber may be nitrogen, which does not act on the filaments, or it may be a hydrocarbon, such as marsh-gas, or even rarefied coal-gas free from oxygen and vapor, which, at a very low pressure, has no material action on the filaments. In all cases the gas should be dry and kept at a reduced pressure, so as the better to eliminate the gases or vapors liberated by the heating; and if the gas be supplied hot the electricity required for heating can, to a certain extent, be economized, and the gases and vapors are more readily evolved and abstracted during the early stage of the process. Such being the general character of my method of carbonizing, I will now describe several forms of apparatus suitable for carrying it into effect practically, these apparatus, though they differ somewhat in form, being all based on the same general principles.

Figure 1 is a vertical section of one form, Fig. 1ª being an end view and Fig. 1ᵇ a plan showing the mold and its fixing. Fig. 2 is a transverse section of a mold suitable for a filament of the usual horseshoe form. Figs. 3 and 4 are vertical sections showing modified forms of the apparatus.

In all the figures corresponding parts are marked by corresponding letters of reference.

Referring first to Figs. 1, 1ª, and 1ᵇ, on a base, B, which may be of metal, is placed a hood, A, which may also be of metal, but which is preferably of glass, so that the interior can be seen. When the hood is made of metal it should have glass or talc sight-holes. Through asbestus stuffing-boxes *b* pass clear of the metal two stout conducting wires or rods, C, which terminate at the top in massive sockets D, provided with setting-screws *d*. In these sockets are clamped the two enlarged ends of the mold M, which is a block of carbon having sunk in it a groove to receive a number of horseshoe-filaments. These may be left open; but I prefer to cover them by a carbon slab, *m*.

In clamping the ends of the mold in the sockets D it is of advantage to place under and over each of them strips of copper, *c*, the upper strip being under a piece of iron, *i*, which is pressed down by the setting-screws *d*. These pieces of copper secure good conduction between the sockets D and the mold M. By a pipe, P, made with a distributing-outlet, *p*, gas is admitted to the casing, the outlet for the gas being by a pipe, Q. Both pipes P and Q are provided with stop-cocks, by which the supply and discharge of the gas can be regulated.

The mold M may be made in pieces, as shown in Fig. 2—one central piece, S, over which the horseshoe-filaments are placed astraddle, and these may be covered with an external piece, T.

In the form of apparatus shown in Fig. 3, the conductors C C, instead of both passing through the base of the casing, pass through opposite sides.

In the form shown in Fig. 4 one side, A', is jointed to the casing by insulating material I, and the mold M is secured in sockets D D, one of which is fixed to the insulated side A' and the other held by a set-screw to the opposite side.

When the outer envelope is of glass, as A, Fig. 1, it is of advantage to surround the mold with an internal case or hood to check local radiation and conversion.

In operating with apparatus such as I have described, I place in the chamber the mold or case M with the filaments, making a sound connection of it to the conductors C C. I then close the chamber by putting on the hood A or otherwise making tight the joint, and having withdrawn the air and charged the chamber with the desired atmosphere, such as nitrogen or hydrocarbon gas at a pressure below that of the atmosphere, I pass first a moderate current and then an increasing current of electricity through the conductors and mold, so as gradually to heat the mold and the filaments, while I maintain a constant change of the atmosphere within the chamber, and I continue this until the filaments attain a very high temperature.

Heretofore, in a system of lighting by electrical incandescence, it has been proposed to bring all the incandescent conductors of a series to as nearly as possible the same resistance by placing the carbon filaments of high resistance in a vessel heated to incandescence by an electric current, and through which vessel is passed a carbon compound in a gaseous state, which will be decomposed by the heat and will deposit other carbon on the carbon filaments until their size or mass is increased and their resistance diminished to the proper point. Such, therefore, I do not claim.

Having thus described the nature of my invention and the best means I know of carrying the same out in practice, I claim—

In the manufacture of carbon filaments for incandescent electric lamps, the herein-described method of effecting their carbonization, by placing them in or on a mold or case which is electrically heated within a closed chamber containing a suitable atmosphere, substantially as described.

In testimony whereof I have signed my name to this specification, in the presence of two subscribing witnesses, this 7th day of September, A. D. 1886.

WM. MAXWELL.

Witnesses:
OLIVER IMRAY,
Patent Agent, 28 Southampton Buildings, London, W. C.
L. V. BRINDLEY,
28 Southampton Buildings, London, W. C.